Jan. 13, 1970     H. F. SCHULTZ ET AL     3,488,899
ROOF STRUCTURE
Filed Jan. 31, 1968     2 Sheets-Sheet 1
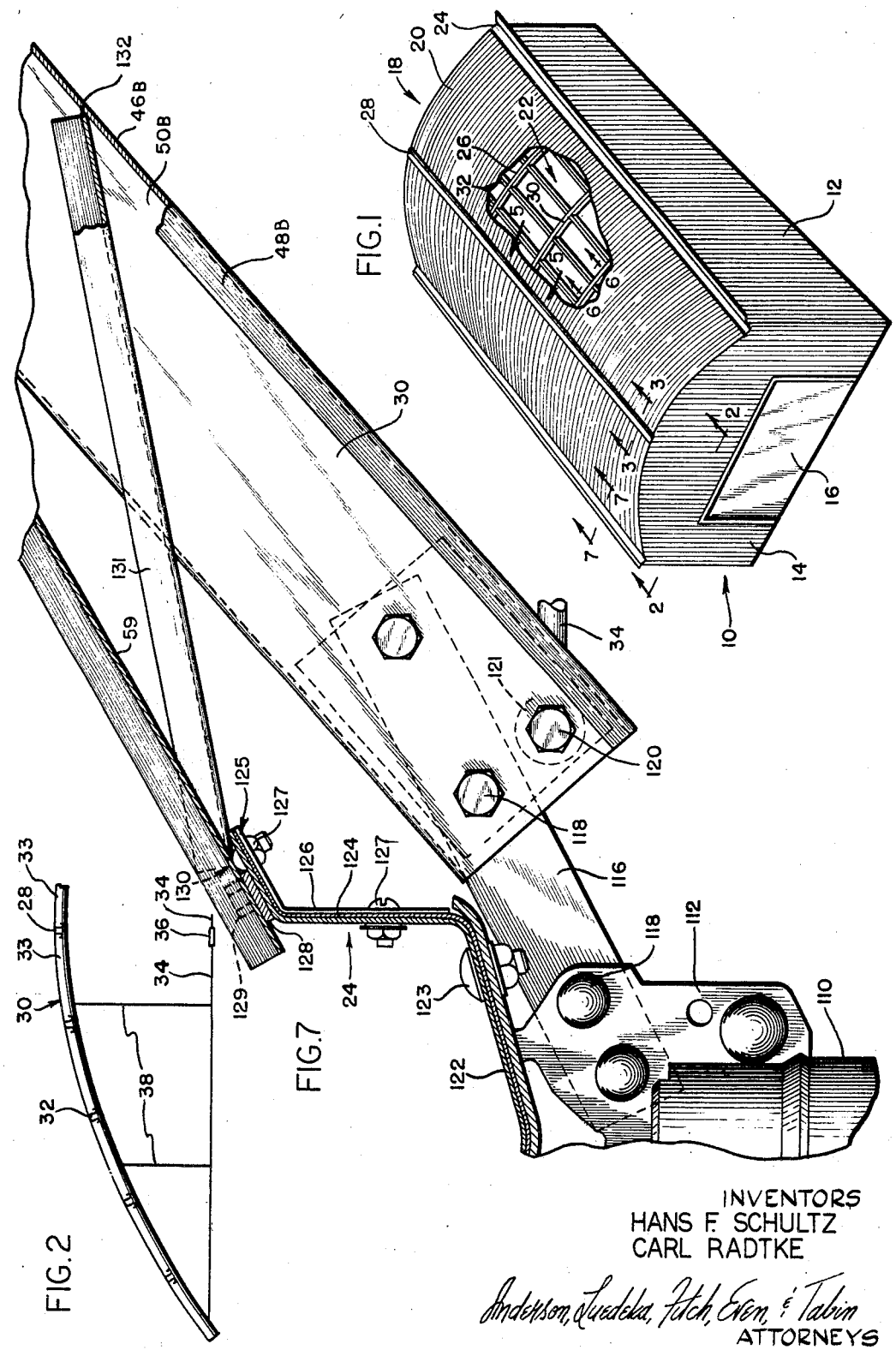
INVENTORS
HANS F. SCHULTZ
CARL RADTKE
ATTORNEYS Jan. 13, 1970   H. F. SCHULTZ ET AL   3,488,899
ROOF STRUCTURE
Filed Jan. 31, 1968   2 Sheets-Sheet 2
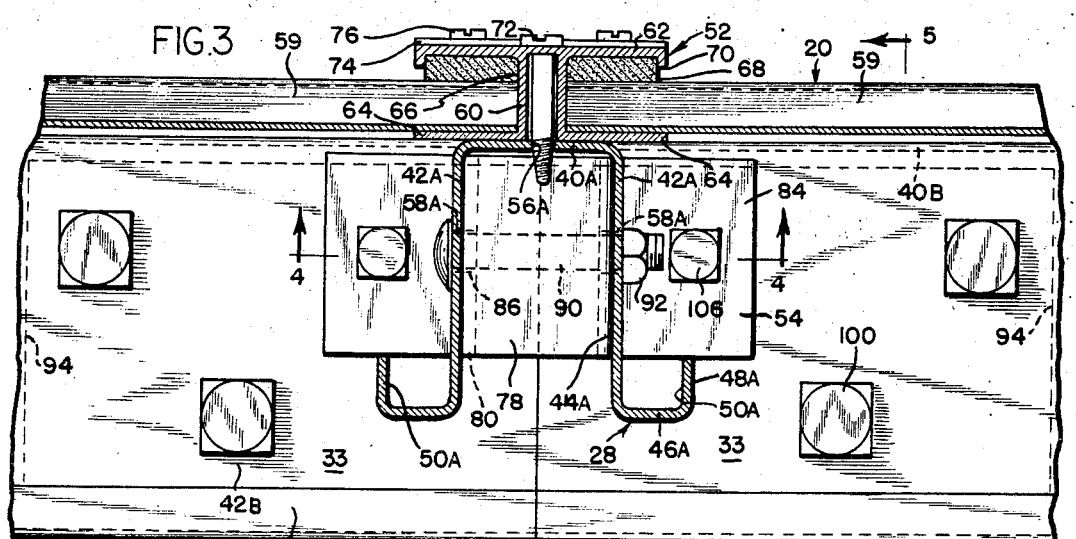
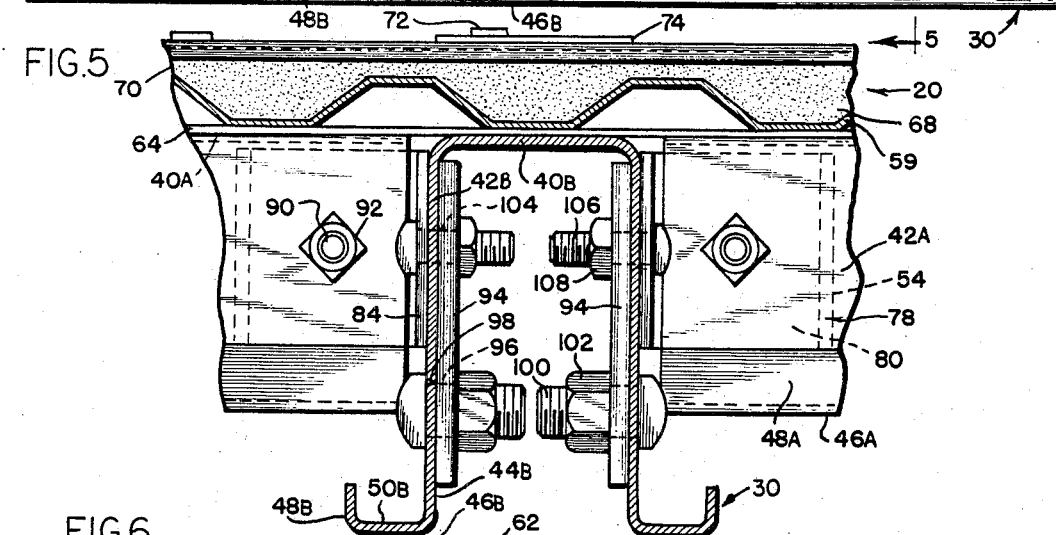
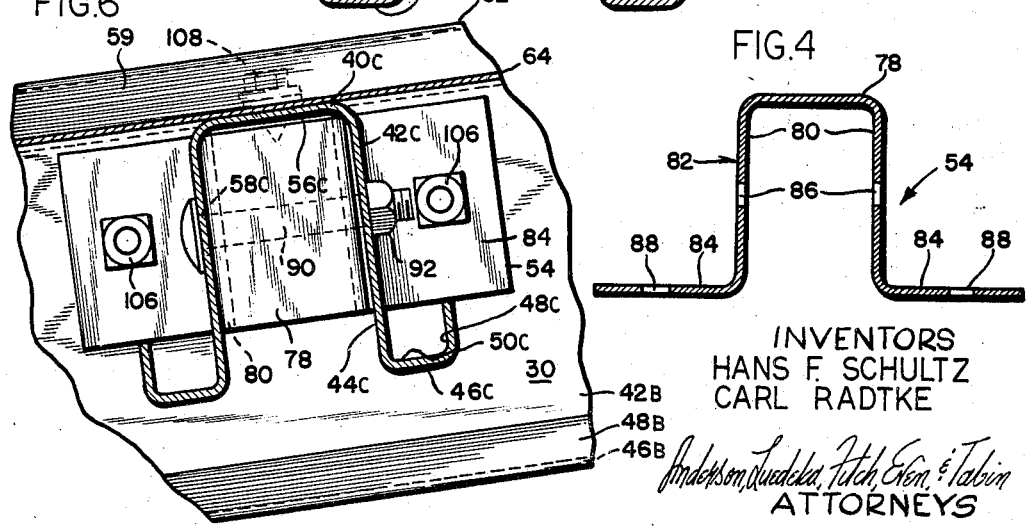
INVENTORS
HANS F. SCHULTZ
CARL RADTKE
ATTORNEYS

United States Patent Office 3,488,899
Patented Jan. 13, 1970

3,488,899
ROOF STRUCTURE
Hans F. Schultz, Park Ridge, and Carl Radtke, Chicago,
Ill., assignors to Ickes-Braun Glasshouses, Inc., Chicago,
Ill., a corporation of Illinois
Filed Jan. 31, 1968, Ser. No. 702,098
Int. Cl. E04d 13/00; E04b 7/08
U.S. Cl. 52—14                                              7 Claims

ABSTRACT OF THE DISCLOSURE

An improved covered roof structure with framework members having upwardly facing U-shaped channels on each side providing paths for the downward flow of condensation on the inner surface of the roof. Purlin and ridge pole channels end at points spaced from the rafters they intersect and condensation drops into the rafter channels positioned below them. A connector is also provided with a central portion which fits within and is attached to the ends of ridge pole and purlin sections and ears which are attached to the intersecting rafters. The channels are connected to an external drain system at the edges of the roof.

---

This invention relates to roofs and, more particularly, to a covered roof structure which is especially adapted for efficiently disposing of internal condensation such as occurs on thermally uninsulated roofs.

There is a growing use of buildings having roofs and walls fabricated of various forms of glass as a result of improved glass technology. Such structures are useful, not only as traditional greenhouses for plant cultivation, but also as enclosures for swimming pools, tennis courts, solariums and the like where the admission of natural light is desirable.

A pressing problem associated with such structures is condensation on the inner surfaces of the structure and particularly on the roof of the structure. Such condensation occurs when the temperature of the inner surface falls below the dew point of the adjacent air within the structure. The problem is not confined to glass structures but may be present whenever the roof is not thermally insulated and low external temperature causes the inner surface to be much cooler than the temperature of the air in the building. The problem tends to be most acute with translucent glass, since such a material absorbs little radiant energy from the sun. One method of avoiding the problem is to utilize insulated roof panels. For glass structures one could utilize two spaced apart layers of glass with an intermediate insulating layer of air, the conventional type of glass structure marketed under the trademark "Thermopane." Such a solution is expensive, however, and is made even more so where the panels are curved, as in the roofs of quonset or dome type structures. Efforts of builders have therefore centered on developing improved systems for disposing of the condensation rather than upon means of preventing it.

Accordingly, it is an important object of the present invention to provide an improved covered roof structure which will facilitate the disposition of internal condensation.

Further objects of the invention include providing a roof structure having a minimum number of standard elements so designed as to simplify fabrication of parts and their assembly.

Other objects and advantages of the invention will become apparent from the following description when considered in conjunction with the accompanying drawings in which:

FIGURE 1 is a partially broken away perspective view of a building with a roof structure showing various features of the invention;

FIGURE 2 is a partially diagrammatic cross-sectional view of a portion of the roof structure of FIGURE 1 looking in the direction of the arrows 2—2 in FIGURE 1;

FIGURE 3 is an enlarged sectional view of the central portion of the roof structure taken along line 3—3 in FIGURE 1;

FIGURE 4 is an enlarged sectional view of the connector shown in FIGURE 3 taken along line 4—4 in FIGURE 3;

FIGURE 5 is an enlarged sectional view of a portion of the structure taken along line 5—5 in FIGURE 1;

FIGURE 6 is an enlarged sectional view of a portion of the structure taken along the line 6—6 in FIGURE 1; and FIGURE 7 is an enlarged view of an edge of the roof structure taken along line 7—7 in FIGURE 1.

As shown in FIGURE 1 a building structure 10 generally includes side walls 12, end walls 14, an entrance 16 and a roof 18. The roof 18 includes a roof covering 20 and a supporting framework 22. As illustrated, the building structure resembles a quonset hut; that is, the roof 18 has the form of a portion of a circular cylindrical surface. The illustrated structure differs from a conventional insulated metal quonset hut, however, in that the roof 18 is attached to vertical side walls 12 rather than extending to the ground level on each side and is formed of an uninsulated material, which may be corrugated glass such as that marketed under the trademark Fiberglas. At the edges of the roof 18 adjacent the side walls 12 longitudinally extending gutters 24 are provided along with suitable downspouts connected thereto (not shown).

The framework 22 comprises a plurality of elongated framework members 26 which includes a ridge pole 28 at the peak of the roof extending between the two end walls, a plurality of rafters 30 arching between the side walls 12 or the edges of the roof, and a plurality of horizontal purlins 32 extending parallel to the ridge pole. Although the rafters are illustrated as being curved longitudinally, straight rafters and a rectilinear roof could be used.

As best shown in FIGURE 2 each rafter of the illustrated roof is formed of two curved sections 33 joined end to end at the peak of the roof which are maintained in tension by two horizontal truss rods 34 attached at their remote ends to the lower end of the rafter. The rods have respective right hand and left hand threads at their adjacent ends and are joined by a turnbuckle 36 with which the tension may be adjusted. The framework is further stabilized by spaced vertical rods 38 joining a rafter 28 and associated truss rods 34 at suitable intervals.

The elongated frame members and their connections are best shown in FIGURES 3-6. FIGURES 3, 5 and 6 show the cross sections of the ridge pole 28, a rafter 30 and a purlin 32, respectively. It may be seen that a similarity in form between the different members exists and similar portions thereof will be designated by the same numeral followed by the letter A, B, or C, respectively. Indeed, as illustrated, the purlins and ridge pole members are identical in form differing only in position and relationship to other portions of the roof. Specifically, each frame member, as illustrated, is an integral extrusion of a storing light weight material such as aluminum. Each frame member includes a substantially flat longitudinally extending head 40 and two legs 42 extending downward from the head to define a downwardly facing U-shaped passage 44. The legs 42 each terminate at a horizontal foot 46 integral with the legs 42 and extending outward therefrom and an upturned toe 48 so as to define two U-shaped upwardly facing channels 50 on each side of the frame member for the flow of condensation.

Turning now to the specific illustrations, FIGURE 3 shows in cross section the ridge pole 28 of the illustrated roof structure. This figure also shows the roof covering 20, a cap member 52 for joining the roof covering to the ridge pole, and two abutting sections of a rafter 30. The ridge pole extends between the two end walls 14 of the building 10 and is positioned along the peak of the roof. As illustrated the ridge pole is formed of a plurality of sections joined at each end to the adjacent rafters 30 by connectors 54.

As previously noted, the ridge pole includes a head 40A, legs 42A, feet 46A and toes 48A so as to define a downwardly facing U-shaped passage 44A and two condensation channels 50A. The head 40A of the ridge pole 28 is at the same level as the head 40B of the adjacent rafter. The ridge pole head 40A is provided with threaded screw holes 56A suitably spaced along its length for securing the cap member 52 to the ridge pole. Each of the legs 42A is provided with suitable connecting bolt holes 58A in register with one another adjacent the ends of each section of the ridge pole for connection of the sections as will be described below.

In the illustrated structure the roof covering 20 is of corrugated Fiberglas formed in curved sheets or panels 59 which extend downwardly from the ridge pole 28 to the side gutters 24. The upper edge of the panels is attached to the ridge pole 28 by means of the cap member 52.

The cap member 52 which like the ridge pole may be formed of sections, as illustrated in cross section, includes a central body 60, a horizontal top deck 62 and two horizontal bottom decks 64 each extending outwardly from the central body to define two recesses 66 for receiving the upper edge of two roof panels 59. A roof panel 59 rests on the upper surface of each bottom deck 64 and the remainder of the recess 66 is filled with a suitable sealing material 68 such as vulcanized butyl sealing tape. As shown the seal is made more effective by providing a short downwardly extending tab 70 at each end of the top deck 62 which, with the central body and top deck of the cap member and the top of the roof panel 59, define an almost completely enclosed space for the sealing material 68. The bottom decks 64 of the cap member and the bottom of the central body rest on the head 40A of the ridge pole. The cap member 52 and panels 59 are securely attached to the ridge pole 28 by longitudinally spaced cap screws 72, the heads of which abut the top deck of the cap member and which extend through the central body 60 into the mating threaded screw holes 56A in the head of the ridge pole. The joint between each section of the ridge pole and cap member is covered by a splice plate 74 secured to the top deck of the cap member by splicing screws 76.

The sections of the ridge pole are securely joined at their ends to adjacent rafters by means of connectors 54. A connector, which is separately illustrated in FIGURE 4, comprises a generally U-shaped clip having a base 78 and two side walls 80 together comprising a central portion 82 and with two outwardly extending ears 84 at the end of each wall 80 remote from the base 78. The side walls are each provided with bolt openings 86 which register with one another. The ears are also provided with both holes 88 to facilitate connection with other frame members as will be described below. The base 78 is of such a width that the two side walls 80 are adapted for a tight fit with the legs 42A of the ridge pole 28 when the central portion is inserted in the end of a section of the ridge pole with the side walls 80 and legs 42A in contact. When this is accomplished, as seen in FIGURE 3, the ears 84 are outside of the ridge pole section and extend horizontally transversely to the ridge pole and thus aid in spacing the end of the ridge pole section from the adjacent rafter. The ears 84 are of such a height that in this position the ends of the ridge pole channels 50A are not obstructed so that condensation can flow out of them. When the central portion 82 is thus inserted in the passage 44A the leg bolt openings 86 in the connector are caused to register with the bolt holes 58A in the ridge pole side walls. A connecting bolt 90 which, as illustrated, is an oval T-head bolt, extends through both the bolt openings 86 and bolt holes 58, the ridge pole and connector being secured to one another by a nut 92 on the threaded bolt end.

As previously described, and as shown in FIGURE 3, each rafter 30 is formed of two sections 33 which abut one another end to end at the peak of the roof. As best shown in FIGURE 5, in cross section each rafter is similar in form to the ridge pole with a generally horizontal head 40B and legs 42B which define a downwardly facing passage 44B and feet 46B and toes 48B which with the legs define two upwardly facing channels 50B for condensation flow. The height of the legs 42B however is such that the channels 50B are each located below the channels 50A of the ridge pole so that condensation in the ridge pole channels flows out at the end of each ridge pole section and drops into the adjacent rafter channel 50B. The abutting rafters are joined to one another by means of two rafter splicing plates 94 positioned within the legs 42B of the rafters and provided with suitable bolt holes 96 which register with splicing bolt holes in the rafter side walls 98 adjacent the end of each rafter. Splicing bolts 100 with splicing nuts 102 secure the abutting rafters and splicing plates to one another.

The rafter splicing plates 94 as well as the end of each rafter are also provided with connecting bolt holes 104 which register with the bolt holes 88 of a connector 54 when it is in its assembled position in the end of the adjacent section of the ridge pole 28. Connecting bolts 106 pass through each of the sets of registered holes and with connecting nuts 108 secure together the connector 54, rafters 30 and splicing plates 94, thus securing the adjacent ridge pole section and rafters to one another. Similar connecting bolt holes 104 are provided at spaced intervals along each rafter for connection of the purlins to the rafter (FIGURE 6).

As best illustrated in FIGURE 6, the purlins 32 comprise a plurality of sections extending between adjacent rafters and having a form generally similar to the frame members of the ridge pole. Thus, the purlins in cross section include a head 40C and legs 42C which define a generally downwardly facing passage 44C. They also include an outwardly extending foot 46C and upturned toe 48C which with the legs define upwardly facing condensation channels 50C. The purlins, however, are each set at such angles and heights so that the surfaces of their heads are parallel to and engage the overlying roof panels. The purlins are provided with connecting bolt holes 58C which register with one another. Each purlin section is joined to the adjacent rafters by connectors 54, connecting bolts 90 and 106 and nuts 92 and 108 in a manner similar to the previously described joinder of the ridge pole to the adjacent rafters. The dimensions of the purlins are similar to those of the ridge pole so that a similar flow of condensation from the purlin channels to the adjacent rafter channels can occur. The heads 40C of the purlins are provided with suitably spaced threaded screw holes 56C which are engaged by tapping screws 108 which serve to secure the roof panels to the purlin.

The roof structure at its edges adjacent the side walls 12 is illustrated in detail in FIGURE 7. As there shown a vertical wall support 110 has mounted thereon a gutter bracket 112 which supports the gutter 24. The wall support 110 is linked by a suitable connector 116 and bolts 118 to the lower end of a rafter. A truss bolt 120 through the passage 44B of the rafter is engaged by an eye 121 at the end of a truss rod 34. The gutter 24 includes a bottom portion 122 attached to the bracket by suitable screws 123, a side portion 124 and an upper flange 125 which is set at the same angle as the outer edge of the roof panel 59. The side and flange are reinforced by a layer 126 attached by screws 127. A sealing closure strip 128 extends longitudinally along the flange between the roof panel and the flange and is secured thereto by tapping screws 129 at suitable intervals. The closure strip is interrupted or has a gap 130 at two points adjacent each rafter to provide an outlet for condensation. Each of these points is linked to the corresponding condensation channel 50B of the adjacent rafter by a U-shaped trough 131 so shaped that one end thereof fits snugly within the channel 50B. The opposite end of the trough rests upon the edge of the gutter flange 125 adjacent a gap in the closure strip. The joint between the trough 131 and channel 50B is sealed with an epoxy resin 132 or the like so as to insure that all condensation in the channel enters the trough and is thence conducted to the external gutter.

It may be seen that the foregoing roof structure provides an improved method of disposing of internal condensation since condensation on the inner surface of the roof panels will inevitably collect in the channels of the ridge pole or purlins and flow thence to the rafter channels and via the trough to the outside drainage system outside of the roof. Moreover, the elements of the structure are easily fabricated and easily assembled.

Various changes and modifications may be made in the foregoing roof structure. For example, a rectilinear roof structure might be utilized and the exact illustrated configuration of the members might be changed.

We claim:
1. A covered roof structure including a plurality of interconnected elongated framework members, each comprising a substantially flat longitudinally extending head for supporting a roof covering, two legs extending downwardly from said head to form a downwardly facing U-shaped passage for receiving a connecting member inserted longitudinally at each end thereof and a generally upwardly facing U-shaped channel outwardly of at least one of said legs to provide a path for the generally downward flow of condensation on the inner surface of the roof covering, a plurality of connecting members each having a base, two side walls and two ears extending outwardly from said side walls, said side walls engaging the legs of a selected framework member with said ears extending transverse to said selected framework member at an end thereof and longitudinally along a leg of a second framework member, means securing said side walls and said legs of said selected framework member to one another, and means securing said ears and said leg of said second framework member to one another, whereby said two framework members are secured to one another.

2. A roof structure improvement according to claim 1 wherein said elongated framework members include a plurality of generally horizontally extending members and a plurality of generally downwardly extending rafters intersecting said horizontal members, said channels of said rafters communicating with channels of said horizontal members at each intersection thereof so that condensation flows horizontally in said channels of said horizontal members to said rafters and thence downwardly in said rafter channels.

3. A roof structure improvement according to claim 2 wherein said horizontal members terminate at points spaced from the legs of said rafters and ends of said channels of said horizontal members are positioned above the channels of said rafters at each intersection thereof so that condensation drops from the ends of said horizontal members channels to said rafter channels.

4. A covered roof structure comprising a ridge pole, a plurality of rafters extending downwardly from said ridge pole, and a plurality of purlins parallel to the ridge pole, said ridge, pole, rafters and purlins each comprising a head and two legs defining a downwardly facing U-shaped passage for receiving a connecting member inserted longitudinally at each end thereof, and an outwardly extending foot and upturned toe outwardly of said legs defining an upwardly facing U-shaped channel for the generally downward flow of condensation on the inner surface of the roof, said rafters each extending continuously between opposite edges of said roof and said ridge pole and said purlins each comprising a plurality of sections extending between adjacent rafters, and a plurality of connecting members for joining said sections to said rafters, each comprising a central portion inserted longitudinally in and attached to the legs of a section at the end thereof and two ears extending transverse to said section and longitudinally along a leg of an adjacent rafter and adapted for attachment to the adjacent rafter leg.

5. A roof structure according to claim 4 wherein said ridge pole channels and purlin channels communicate with adjacent rafter channels.

6. A roof structure according to claim 4 wherein said rafter channels are each positioned below the channels of the ridge pole and purlins at each intersection thereof, and said ridge pole and purlins terminate at points spaced from the legs of said rafters so that condensation in said ridge pole and purlin channels drops into adjacent rafter channels.

7. A roof structure according to claim 4 including means connected to said rafter channels and extending through said roof covering for conducting the condensation outside of the roof.

References Cited

UNITED STATES PATENTS

| | | | |
|---|---|---|---|
| 951,112 | 3/1910 | Grenier | 52—461 X |
| 1,379,359 | 5/1921 | Partzschefeld | 52—461 X |
| 1,656,044 | 1/1928 | Cibulas | 52—95 |
| 2,541,784 | 2/1951 | Shannon | 52—90 |
| 3,113,434 | 12/1963 | Phillips et al. | 52—90 X |

FRANK L. ABBOTT, Primary Examiner

P. C. FAW, Jr. Assistant Examiner

U.S. Cl. X.R.

52—90, 95, 395, 461

UNITED STATES PATENT OFFICE
CERTIFICATE OF CORRECTION

Patent No. 3,488,899          Dated January 13, 1970

Inventor(s) Hans F. Schultz and Carl Radtke

It is certified that error appears in the above-identified patent and that said Letters Patent are hereby corrected as shown below:

Column 6, Line 34; Claim 6 should be dependent upon Claim 5.

SIGNED AND
SEALED
OCT 20 1970

(SEAL)
Attest:

Edward M. Fletcher, Jr.
Attesting Officer

WILLIAM E. SCHUYLER, JR.
Commissioner of Patents